US007623644B2

(12) United States Patent
Bjornberg et al.

(10) Patent No.: US 7,623,644 B2
(45) **Date of Patent: *Nov. 24, 2009**

(54) SYSTEM FOR EXECUTING ADVANCED INTERACTIVE VOICE RESPONSE SERVICES USING SERVICE-INDEPENDENT BUILDING BLOCKS

(75) Inventors: Greg Bjornberg, Colorado Springs, CO (US); Dale Cobb, Colorado Springs, CO (US); David Phelps, Colorado Springs, CO (US); Phyllis D. Santa, Larkspur, CO (US)

(73) Assignee: MCI Communications Corporation, Ashburn, VA (US)

( * ) Notice: Subject to any disclaimer, the term of this patent is extended or adjusted under 35 U.S.C. 154(b) by 1240 days.

This patent is subject to a terminal disclaimer.

(21) Appl. No.: 10/613,054

(22) Filed: Jul. 3, 2003

(65) Prior Publication Data

US 2004/0136517 A1 Jul. 15, 2004

Related U.S. Application Data

(63) Continuation of application No. 09/073,887, filed on May 7, 1998, now Pat. No. 6,647,111.

(51) Int. Cl.
*H04M 3/42* (2006.01)

(52) U.S. Cl. .............................. 379/201.03; 379/88.18; 379/221.06

(58) Field of Classification Search ............ 379/220.01, 379/201.03, 221.06, 221.08, 220, 242, 243, 379/244, 258, 88.16, 201.02, 88.18
See application file for complete search history.

(56) References Cited

U.S. PATENT DOCUMENTS

| | | | |
|---|---|---|---|
| 4,797,910 | A | 1/1989 | Daudelin |
| 4,845,739 | A | 7/1989 | Katz |
| 4,930,150 | A | 5/1990 | Katz |
| 5,048,075 | A | 9/1991 | Katz |
| 5,128,984 | A | 7/1992 | Katz |
| 5,133,004 | A | 7/1992 | Heileman, Jr. et al. |
| 5,165,095 | A | 11/1992 | Borcherding |
| 5,185,781 | A | 2/1993 | Dowden et al. |

(Continued)

OTHER PUBLICATIONS

Emerson, S. Thomas, "Voice Response Systems—Technology to the Rescue for Busniess Users", Speech Techonology, pp. 99-103 (Jan./Feb. 1983).

(Continued)

*Primary Examiner*—Simon Sing

(57) ABSTRACT

A service execution environment for an advanced interactive voice response (IVR) service node. The service execution environment functions within a next generation service node (NGSN) IVR platform in a telecommunications network. The environment uses individual service-independent building blocks (SIBBs) that allow the creation of customer applications with simple references to the individual primitive SIBBs or composite SIBBs, with branching available. Functional calls to a sequence of SIBBs along with customer specific data stored in a database comprise a complete customer application. When a call is received by an IVR service node, the application is executed by calling the SIBBs to apply certain treatments to the call. The use of the SIBBs allows increased efficiency in the network because calls can be routed to any NGSN node. Each NGSN needs no customization to perform a particular customer application. The service execution environment decreases the time to market of new customer applications and decreases the turnaround time for modifications to existing customer applications.

31 Claims, 11 Drawing Sheets

U.S. PATENT DOCUMENTS

| | | | | | |
|---|---|---|---|---|---|
| 5,243,643 | A | * | 9/1993 | Sattar et al. | 379/88.23 |
| 5,251,252 | A | | 10/1993 | Katz | |
| 5,255,309 | A | | 10/1993 | Katz | |
| 5,259,023 | A | | 11/1993 | Katz | |
| 5,325,421 | A | | 6/1994 | Hou et al. | |
| 5,349,633 | A | | 9/1994 | Katz | |
| 5,351,285 | A | | 9/1994 | Katz | |
| 5,353,339 | A | | 10/1994 | Scobee | |
| 5,519,772 | A | | 5/1996 | Akman et al. | |
| 5,533,115 | A | | 7/1996 | Hollenbach et al. | |
| 5,553,119 | A | | 9/1996 | McAllister et al. | |
| 5,561,707 | A | | 10/1996 | Katz | |
| 5,572,583 | A | | 11/1996 | Wheeler, Jr. et al. | |
| 5,581,600 | A | | 12/1996 | Watts et al. | |
| 5,583,920 | A | | 12/1996 | Wheeler, Jr. et al. | |
| 5,689,553 | A | | 11/1997 | Ahuja et al. | |
| 5,692,033 | A | | 11/1997 | Farris | |
| 5,706,286 | A | | 1/1998 | Reiman et al. | |
| 5,724,406 | A | * | 3/1998 | Juster | 379/88.13 |
| 5,742,905 | A | | 4/1998 | Pepe et al. | |
| 5,793,771 | A | | 8/1998 | Darland et al. | |
| 5,802,146 | A | | 9/1998 | Dulman | |
| 5,805,675 | A | | 9/1998 | Chanda | |
| 5,818,921 | A | | 10/1998 | Vander Meiden et al. | |
| 5,825,752 | A | | 10/1998 | Fujimori et al. | |
| 5,854,834 | A | | 12/1998 | Gottlieb et al. | |
| 5,867,494 | A | | 2/1999 | Krishnaswamy et al. | |
| 5,881,131 | A | | 3/1999 | Farris et al. | |
| 5,881,135 | A | | 3/1999 | Watts et al. | |
| 5,881,144 | A | * | 3/1999 | Havens | 379/201.05 |
| 5,883,939 | A | | 3/1999 | Friedman et al. | |
| 5,915,008 | A | | 6/1999 | Dulman | |
| 5,917,900 | A | | 6/1999 | Allison et al. | |
| 5,920,562 | A | | 7/1999 | Christie et al. | |
| 5,923,659 | A | | 7/1999 | Curry et al. | |
| 5,923,859 | A | | 7/1999 | Melo et al. | |
| 5,926,524 | A | | 7/1999 | Taylor | |
| 5,930,348 | A | | 7/1999 | Regnier et al. | |
| 5,931,914 | A | | 8/1999 | Chiu | |
| 5,937,029 | A | | 8/1999 | Yosef | |
| 5,946,386 | A | | 8/1999 | Rogers et al. | |
| 5,953,389 | A | | 9/1999 | Pruettt et al. | |
| 5,956,396 | A | | 9/1999 | Ash et al. | |
| 5,974,252 | A | | 10/1999 | Lin et al. | |
| 5,987,118 | A | | 11/1999 | Dickerman et al. | |
| 5,987,331 | A | | 11/1999 | Grube et al. | |
| 5,995,610 | A | | 11/1999 | Smidt et al. | |
| 5,999,525 | A | | 12/1999 | Krishnaswamy et al. | |
| 6,003,031 | A | | 12/1999 | Hartikainen et al. | |
| 6,014,428 | A | | 1/2000 | Wolf | |
| 6,018,567 | A | | 1/2000 | Dulman | |
| 6,038,293 | A | | 3/2000 | McNerney et al. | |
| 6,041,325 | A | | 3/2000 | Shah et al. | |
| 6,044,142 | A | | 3/2000 | Hammarstrom et al. | |
| 6,044,144 | A | | 3/2000 | Becker et al. | |
| 6,044,259 | A | | 3/2000 | Hentila et al. | |
| 6,081,591 | A | | 6/2000 | Skoog | |
| 6,104,803 | A | | 8/2000 | Weser et al. | |
| 6,108,410 | A | | 8/2000 | Reding et al. | |
| 6,111,893 | A | | 8/2000 | Volftsun et al. | |
| 6,122,345 | A | | 9/2000 | Johnson | |
| 6,134,311 | A | | 10/2000 | Ekstrom | |
| 6,137,862 | A | | 10/2000 | Atkinson et al. | |
| 6,144,727 | A | | 11/2000 | Mashinsky | |
| 6,198,813 | B1 | | 3/2001 | Pullen et al. | |
| 6,233,316 | B1 | | 5/2001 | Schier et al. | |
| 6,366,658 | B1 | | 4/2002 | Bjornberg et al. | |
| 6,389,126 | B1 | | 5/2002 | Bjornberg et al. | |
| 6,418,205 | B2 | | 7/2002 | Capers et al. | |
| 6,427,002 | B2 | | 7/2002 | Campbell et al. | |

OTHER PUBLICATIONS

Hester, et al., "The At&T Mulit-Mode Voice Systems—Full Spectrum Solutions for Speech Processing Applications", Proceedings of the 1985 AVOIS Conference, pp. 1, 3, 5, 7 and 9 (Sep. 1985).

MooseMiller, John, P., "AT&T's Conversant I Voice System", Speech Techonology, pp. 88, 90 and 92 (Mar./Apr. 1986).

Perdue,et al., "Conversant I Voice System Architecture and Applications", AT&T Technical Journal, pp. 34-47 (Sep./Oct. 1986).

* cited by examiner

SYSTEM FOR EXECUTING ADVANCED INTERACTIVE VOICE RESPONSE SERVICES USING SERVICE-INDEPENDENT BUILDING BLOCKS

CROSS-REFERENCE TO RELATED APPLICATIONS

This application is related to commonly-owned, applications filed concurrently herewith, entitled:

"Advanced Interactive Voice Response Service Node" having application Ser. No. 09/073,880, filed May 7, 1998, now U.S. Pat. No. 6,427,002, issued Jul. 30, 2002;

"Telecommunications Architecture for Call Center Services Using Advanced Interactive Voice Response Service Nodes" having application Ser. No. 09/074,096, filed May 7, 1998, now U.S. Pat. No. 6,366,658, issued Apr. 2, 2002;

"Interactive Voice Response Service Node with Advanced Resource Management" having application Ser. No. 09/074,142, filed May 7, 1998, now U.S. Pat. No. 6,496,567, issued Dec. 17, 2002;

"Service Provisioning System for Interactive Voice Response Services" having application Ser. No. 09/074,050, filed May 7, 1998, now U.S. Pat. No. 6,389,126, issued May 14, 2002;

"Communications Signaling Gateway and System for an Advanced Service Node" having application Ser. No. 09/074,072, filed May 7, 1998, now U.S. Pat. No. 6,493,353, issued Dec. 10, 2002;

"Call and Circuit State Machine for a Transaction Control Layer of a Communications Signaling Gateway" having application Ser. No. 09/073,885, filed May 7, 1998, now U.S. Pat. No. 6,418,205, issued Jul. 9, 2002;

The above applications are incorporated herein by reference in their entirety.

This application is also related to commonly-owned, applications, previously filed, entitled:

"Network Call Parking Manager" having application Ser. No. 08/796,839, filed Feb. 7, 1997, now U.S. Pat. No. 6,044,144, issued Mar. 28, 2000; and "System and Method for Call Park and Transfer in a Telecommunications Network" having application Ser. No. 08/796,840 filed Feb. 7, 1997.

The above applications are also incorporated herein by reference in their entirety.

BACKGROUND OF THE INVENTION

1. Field of the Invention

The present invention relates generally to computer telephony, and more, particularly to providing an efficient service execution environment for interactive voice response service platforms to handle calls on a telephone network.

2. Related Art

Interactive Voice Response (IVR) platforms, also commonly known as Voice Response Units (VRUs) or Audio Response Units (ARUs), are common in the telecommunications industry. It is common for a business that is a customer of an IVR service provider to use IVR services in conjunction with call center services. Interactive voice response service nodes are commonly used for customer call center routing. They perform processing of customer applications, based on one or more criteria selected by the customer, such as the dialed number of a call, Dialed Number Identification Service (DNIS), Automatic Number Identification (ANI), time of day, caller-entered digits, geographic point of call origin, etc. The IVR service nodes may also perform other IVR services such as automated servicing of callers for customers, caller surveys, telemarketing, and call parking until a call center has an available resource (e.g., a customer service agent).

While there are many types of IVR service nodes each with variations in architecture and features, they typically include a network audio server that is connected, via voice trunks, to a bridging switch on a switch network. The network audio server typically include many network ports to receive calls and application ports to, process the calls. However, all currently available IVR service nodes have several limitations.

One limitation of conventional IVR service nodes, in particular, is that they have limited application processing capability. The application processors of conventional IVR service nodes are designed so that each customer application is executed as a stand-alone process. This limits the number of applications that may be performed. Also, customers are demanding more customized IVR applications that require specialized architectures. This results in different types of IVR service nodes implemented throughout a network to handle different customer's IVR applications. This results in an inefficient network because a call needing a certain application must be routed to a certain IVR service node; irrespective of that node's current load.

Furthermore, conventional IVR applications are complex software programs. The computing environments that execute these applications are often over utilized in terms of processing resources. Only a limited number of applications may be performed simultaneously. In addition, creating a customer application requires extensive software programming and testing. Therefore, what is needed is a service execution environment for an advanced interactive voice response service node that utilizes a common application processing program to allow an application to be created with simple references to service-independent building blocks (SIBBs).

SUMMARY OF THE INVENTION

The present invention is directed to a system and method for providing a service execution environment for advanced interactive voice response (IVR) service platforms. The system uses a next generation service node (NGSN) as an IVR platform to handle a customer's telephone calls within a telecommunications network.

The system includes the NGSN interfaced to a telephonic switch network, a reusable set of service-independent building blocks (SIBBs), and customer application files created using a sequence of the SIBBs. To keep the independence of the SIBBs, the system also uses a database of customer specific data. At execution, these data are inputs into the SIBBs and together provide IVR services to handle the call.

The method of the present invention includes the steps of defining the rules under which each of the individual SIBBs operate, along with their inputs and outputs. Composite SIBBs may also be defined using a sequence of the individual SIBBs. Once defined, the SIBBs allow the customer to create and modify IVR service applications without any rebuilding and retesting of the SIBBs. Thus, when a call is handled by the NGSN, the customer application file (a sequence of SIBBs) is executed.

An advantage of the present invention is that once crated, tested, and certified, these SIBBs are then available to be combined in any order to produce customer applications. This results in decreasing the time to market of new customer applications and decreasing the turn-around time for modifications to existing customer applications. This also results in increased reliability of the customer applications created using the SIBBs and results in lower maintenance of the customer applications (i.e., changes can be made to the individual SIBBs and not the customer applications).

Another advantage of the present invention is increased network efficiency because a customer's calls may be routed to any NGSN node. With the use of SIBB's to perform IVR services, each NGSN application processor does not need to be customized to perform a particular customer application. Further features and advantages of the present invention as well as the structure and operation of various embodiments of the invention are described in detail below with reference to the accompanying drawings.

BRIEF DESCRIPTION OF TH FIGURES

The present invention will be described with reference, to the accompanying drawings, wherein.

Figure 7A:
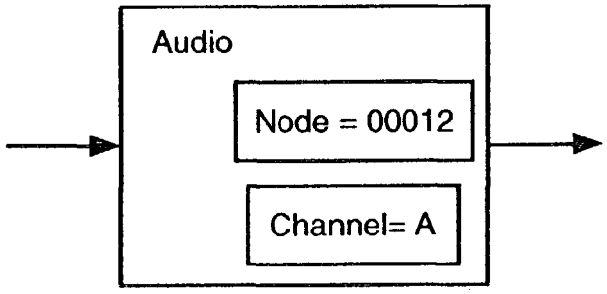
Figure 7B:
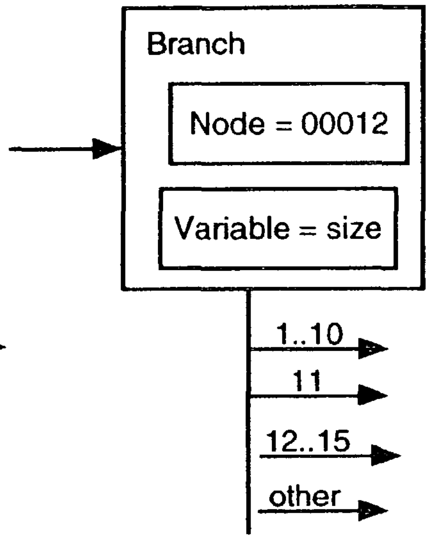
Figure 7C:
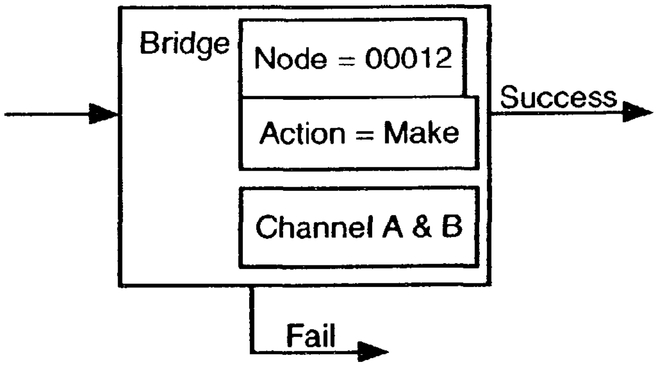
Figure 7D:
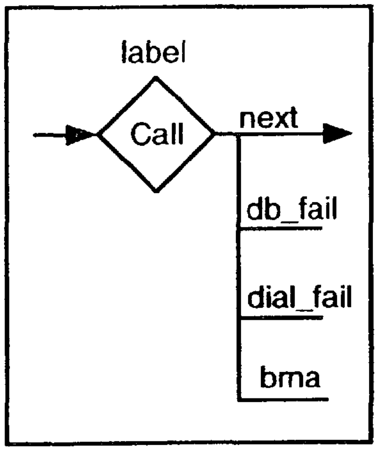
Figure 7E:
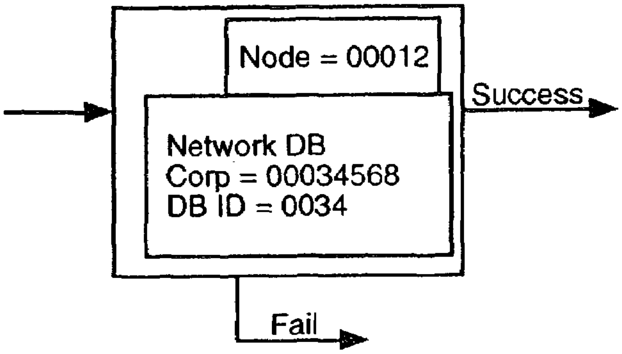
Figure 7F:
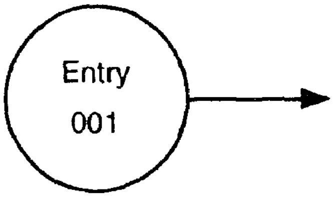
Figure 7G:
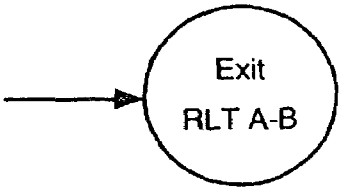
Figure 7H:
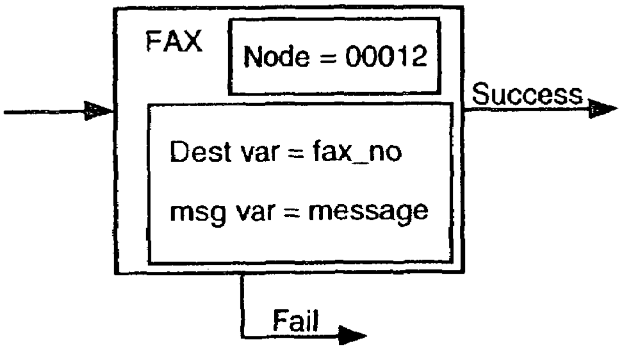
Figure 7I:
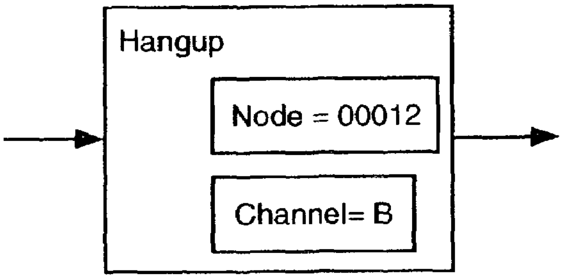
Figure 7J:
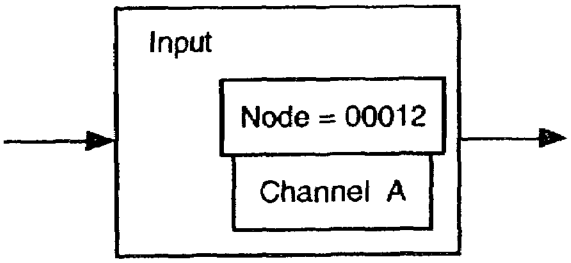
Figure 7K:
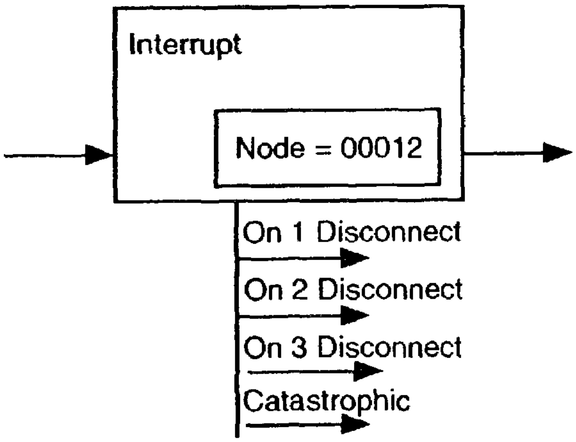
Figure 7L:
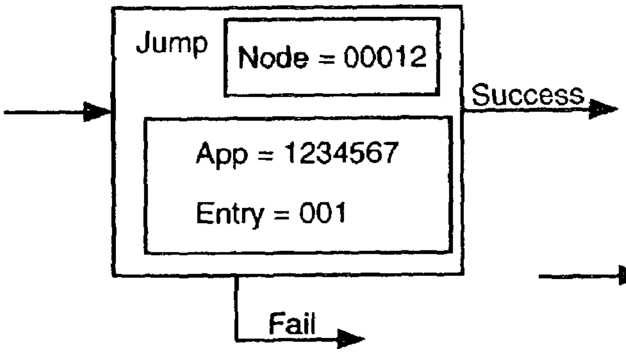
Figure 7M:
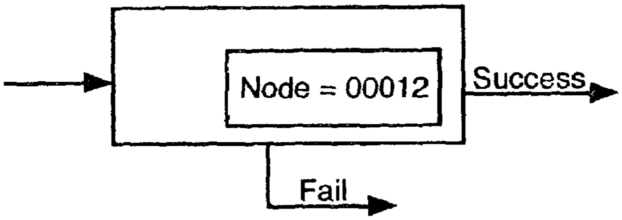
Figure 7O:
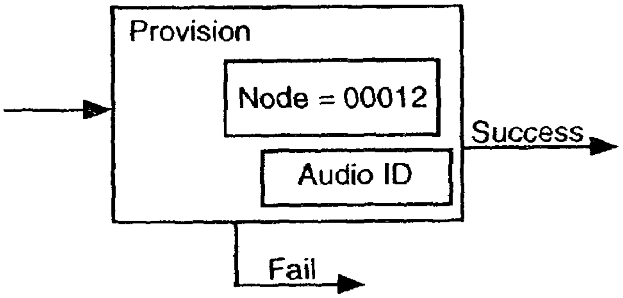
Figure 7N:
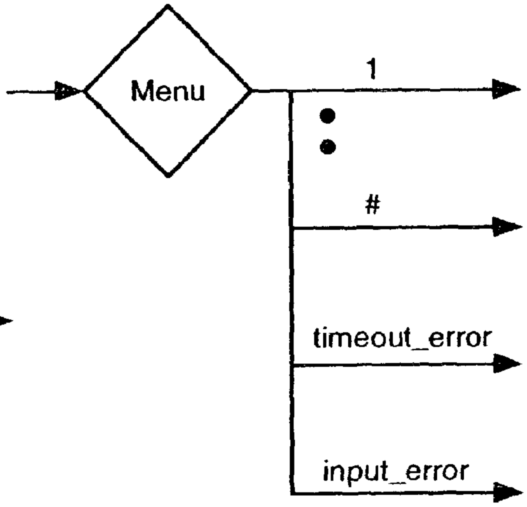
Figure 7P:
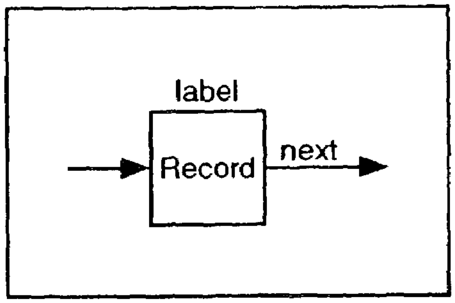
Figure 7Q:
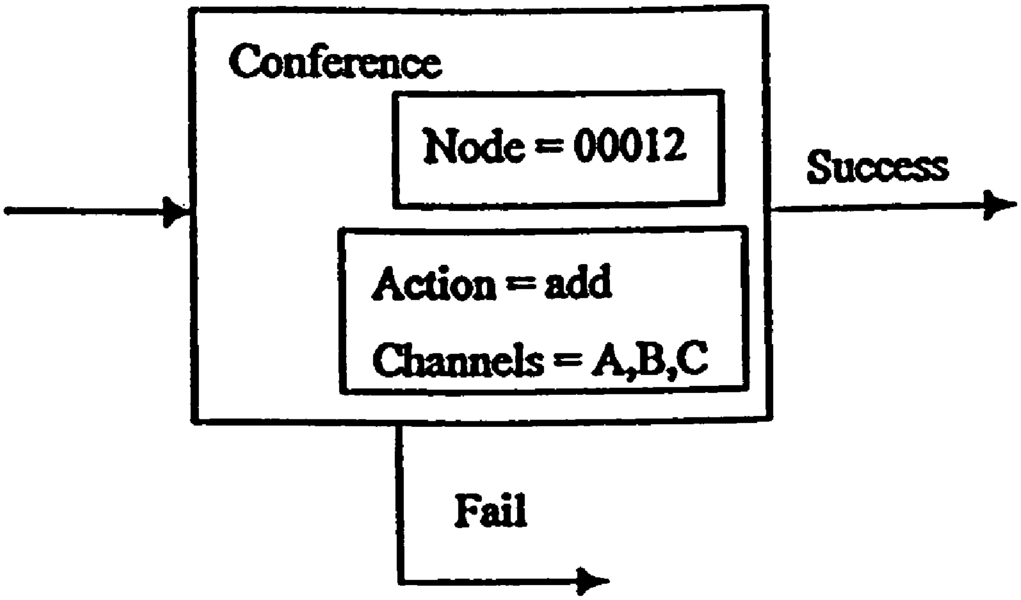
Figure 7R:
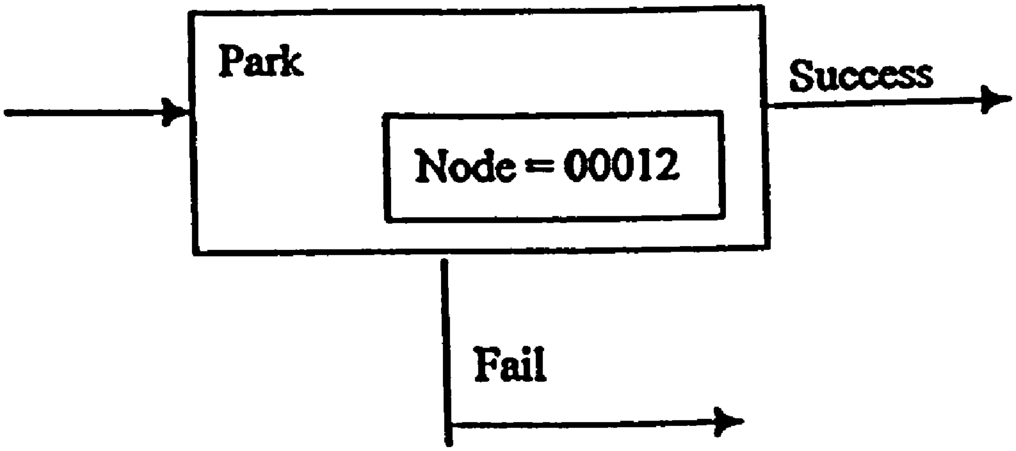
Figure 8A:
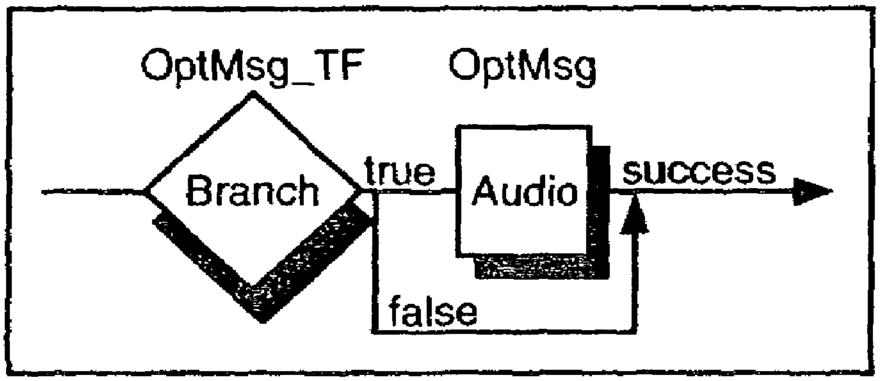
Figure 8B:
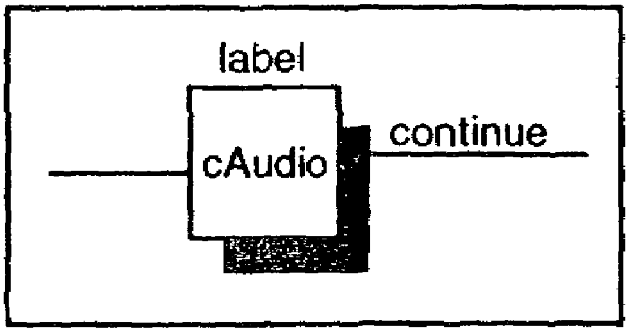
Figure 9:
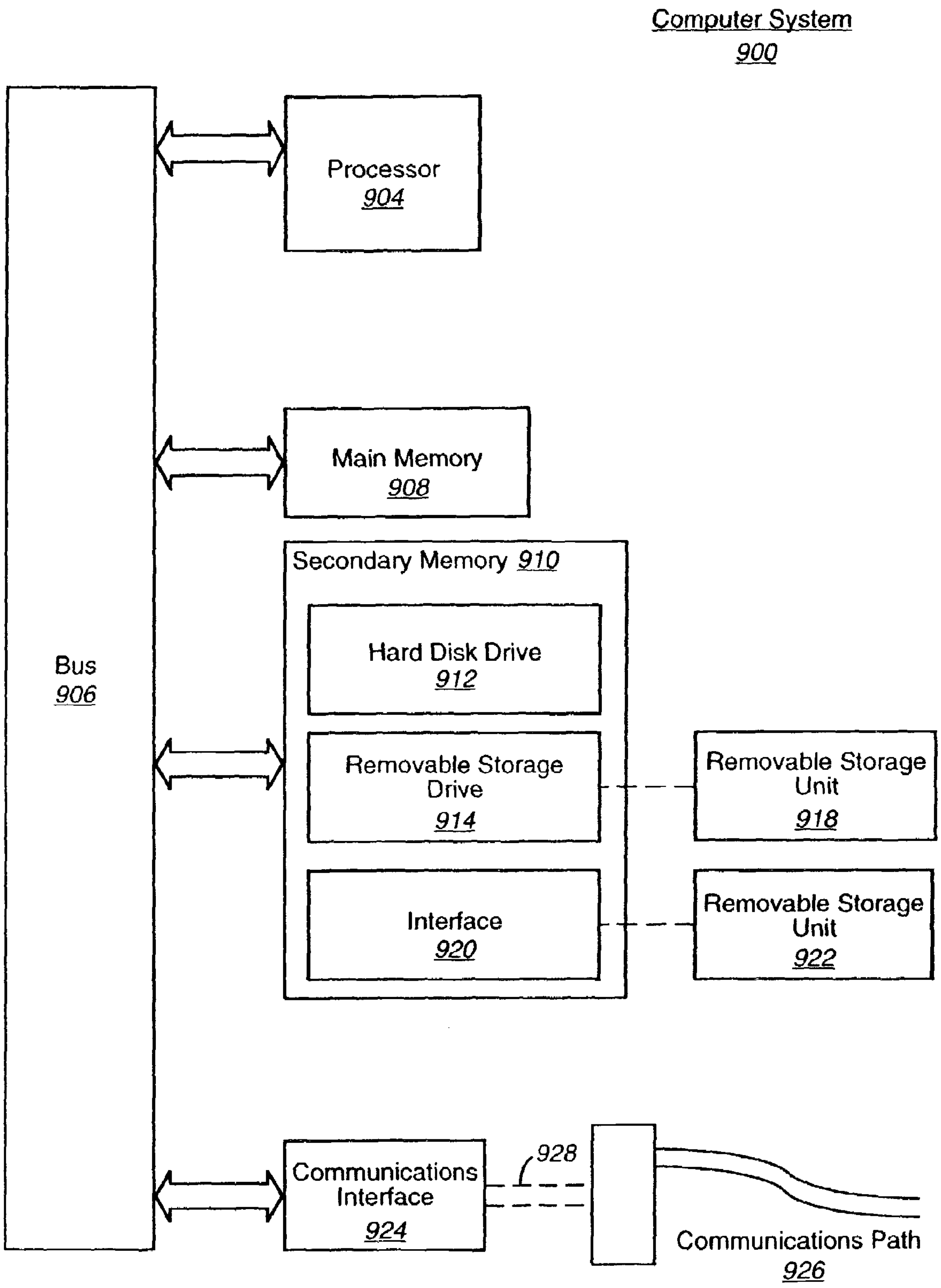

FIGS. 7*a-r* are logical representations of eighteen primitive SIBBs defined according to the present invention;

FIGS. 8*a-b* illustrate an exemplary composite SIBB according to the present invention, and FIG. 9 is a block diagram of an exemplary computer system useful for implementing the present invention.

DETAILED DESCRIPTION OF THE PREFERRED EMBODIMENTS

Overview

The present invention is directed to providing a reusable service-independent building block (SIBB) software architecture for an advanced interactive voice response (IVR) service platform. As the next generation of service nodes for providing IVR services are being implemented, the SIBBs of the present invention will maximize the efficiency of these nodes. In a preferred embodiment of the present invention, a customer of an IVR service provider may have multiple call centers distributed geographically, all of which are accessed by a single toll-free number. A call to the toll free number is routed by a switch network to a next generation service node (NGSN). The NGSN will then need to perform customer applications, which may prompt the caller for certain information and collect other information (e.g., dialed number, caller ANI, etc.) from the network. The particular IVR services performed by the NGSN nodes are defined by customers creating and modifying their customer applications. The SIBBs, once defined and tested, may be used and reused to create or modify these applications. The objective is to allow a customer to quickly and efficiently create and modify the way their calls are handled by using SIBBs. This allows any of the possible plurality of NGSN nodes in a telecommunications network to perform a customer's applications without any software or hardware customization.

The present invention is described in terms of the above example environment. This is for convenience only and is not intended to limit the application of the present invention. In fact, after reading the following description, it will be apparent to one skilled in the relevant art how to implement the following invention in alternate embodiments.

System Architecture

Figure 1:
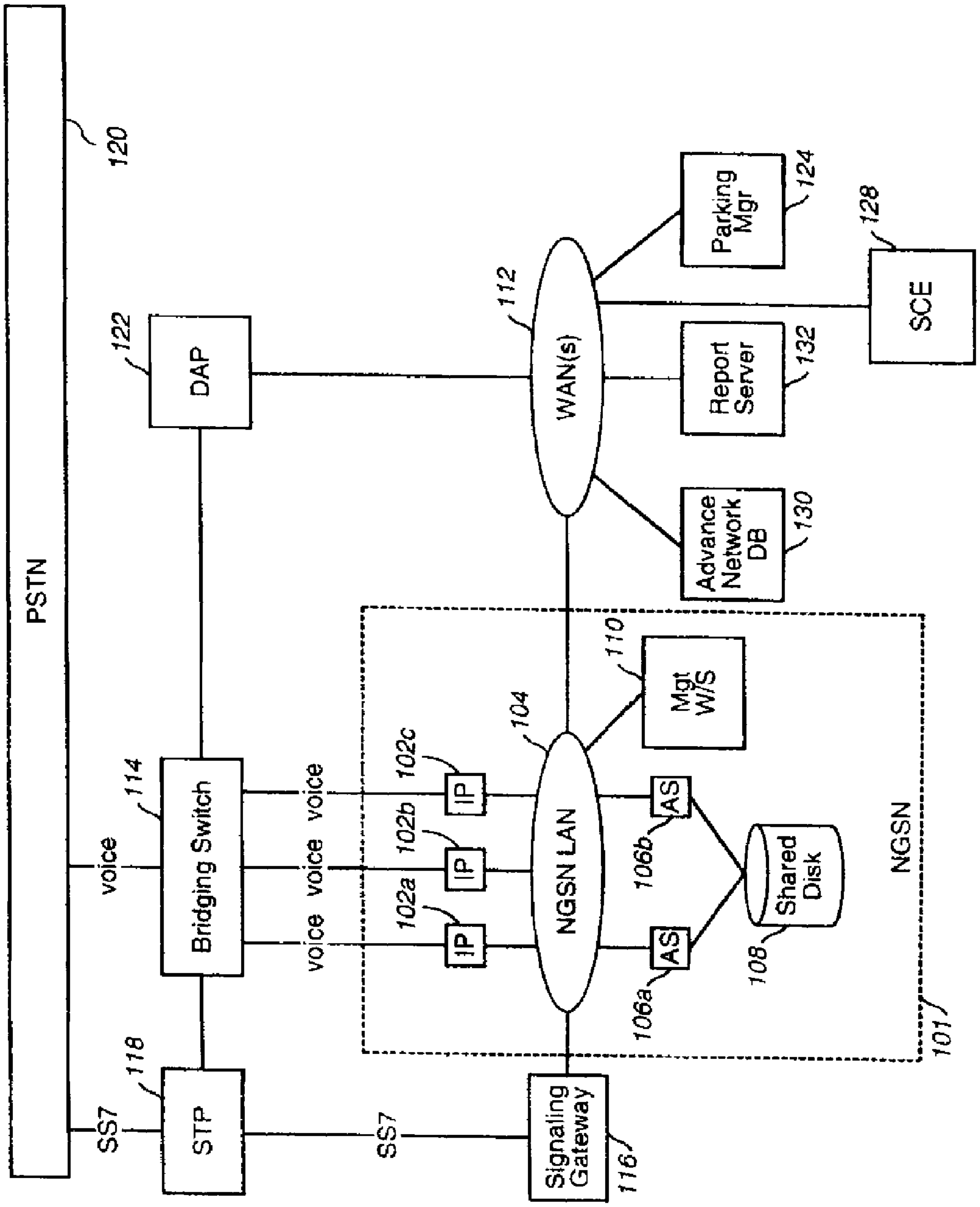
FIG. 1 is a block diagram illustrating a telecommunications network architecture in which the present invention would operate.

FIG. 1 is a block diagram of a telecommunications network architecture 100, showing network connectivity among the various components. Network architecture 100 uses a next generation service node (NGSN) 101 to perform IVR services. The NGSN 101 is a computing and telephony platform that operates as an IVR service node in the network architecture 100. It includes a pair of redundant application servers 106 (shown as "AS" 106*a* and 106*b*), a shared disk array 108, and a plurality of intelligent peripherals 102 (shown as "IP" 102*a*-102*c*).

The intelligent peripherals 102 are computers with telephony ports. The general purpose of intelligent peripherals 102 is to receive calls from the network provide voice responses to the caller, and collect caller input via Dual Tone Multi Frequency (DTMF) signals or voice recognition. The functions of the intelligent peripherals 102 are controlled by applications on the pair of redundant application servers 106. In a preferred embodiment, the intelligent peripherals 102 are built using DEC Alpha Voice 1000 computers and the application servers 106 are DEC Alpha 8400 computers.

The intelligent peripherals 102 and application servers 106 are connected to a NGSN local area network (LAN) 104 which in a preferred embodiment is a gigabit Ethernet switch or a FDDI switch. The NGSN LAN 104 is connected to a wide area network (WAN) 112, which in a preferred embodiment is an Ethernet WAN. The WAN 112 allows multiple NGSN 101 platforms to be connected within the network architecture 100.

Also connected to the NGSN LAN 104 is a node monitoring and alarming (management) workstation ("Mgt W/S") 110. Management workstation 110 collects and stores alarms generated by the application servers 106 and the intelligent peripherals 102, and provides a user interface to these alarms. It also forwards alarms over the WAN 112. The management workstation 110 serves as a central collection point of all alarms generated on the NGSN 101, and forwards them to a central collection point on network architecture 100 via WAN 112.

The NGSN 101 is connected to a bridging switch 114 via T1 voice trunks. Bridging switch 114 provides access to a Public Switched Telephone Network a(PSTN) (referred to as "switch network") 120. In a preferred embodiment, bridging switch 114 is a Northern Telecom DMS-250 digital matrix switch that supports Release Link Trunk (RLT) voice connections to the NGSN 101 and is well known in the relevant art. Although FIG. 1 shows only one NGSN 101 node, network architecture 100 may contain a plurality of NGSN 101 nodes and bridging switches 114. In such an embodiment, each NGSN node would be connected to the switch network 120 via one of the plurality of bridging switches 114.

In a preferred embodiment of the network architecture 100, a signaling gateway 116 communicates with the bridging switch 114, via a signal transfer point (STP) 118, using Signaling System 7 (SS7). The STP 118 performs switching and routing of SS7 signaling messages among various switches in the switch network 120, as well as among other components. The NGSN 101 is connected to the STP 118 via the signaling gateway 116. Use of signaling gateway 116 insulates the NGSN 101 from whatever type of signaling system is used by the switch network 120. In other words, signaling gateway 116 translates between the signaling system used in switch network 120, and the proprietary signaling protocol used in NGSN 101 by the telecommunications service provider. Signaling gateway 116 also performs resource management and call state management for NGSN 101.

A data access point (DAP) 122 serves as a service control point for the network architecture 100. The DAP 122 performs the routing of calls in network architecture 100. The DAP 122 determines routing for special service calls, such as toll-free 800/888 and Virtual Private Network (VPN) calls. The DAP 122 may also be used in routing translations for Local Number Portability. The DAP 122 is also used by NGSN 101 for routing translations for calls transferred from NGSN 101. When a customer application on NGSN 101 determines that a call needs to be extended to the network (call transfer), NGSN 101 sends a routing query to the DAP 122. The DAP 122 responds with a network address for routing the call. Although FIG. 1 shows only one DAP 122, it is envisioned that network architecture 100 may include a plurality of DAPs 122. Each switch in the switch network 120, including the bridging switch 114, and each NGSN 101, are preferably connected to one or more of the plurality of DAPs 122 via the WAN 112.

A parking manager 124 manages the network's call parking resources. Parking resources includes NGSN 101 ports and applications. The parking manager 124 tracks the availability of the various terminations of calls transferred from each of the NGSN 101 nodes. The parking manager 124 uses WAN 112 to communicate with all of the NGSNs 101 in the network architecture 100.

When NGSN 101 executes a customer application to handle a call, several event records are generated by the application. These event records are collected by a central process running on an NGSN 101 application server 106. Event records are sent in batches to a report server 132 via the WAN 112. The report server 132 is a computer that provides centralized reporting of NGSN 101 application performance results and call events. It collects all call event information that is generated during a call to a NGSN 101, and summarizes the event information into a report containing call statistics for each customer application.

An advanced network database 130 is a computer that embodies a database and database management system. The advanced network database 130 is used to provide NGSN 101 with data pertaining to a customer application. These data control the application's handling of a call, and may be updated in near real-time by a customer in order to tweak the performance or operation of an application. For example, there may be multiple routing plans for a single customer application, with each plan being selected based on some criteria, such as time of day, day of week, caller ANI, or caller input. The NGSN 101 application processor would then query the advanced network database 130 for the appropriate routing plan.

The advanced network database 130 is used in conjunction with the report server 132 to provide a customer with enhanced control over their applications. The customer may view, on-line and in near real-time, their application's call processing statistics on the report server, and determine the current performance of their application.

A service creation environment (SCE) 128 is a computing platform used to create NGSN 101 customer applications. The SCE 128 will be explained in further detail below with reference to the Service Execution Environment and FIGS. 4-8.

A NGSN 101 platform architecture and functionality is described in further detail in a commonly-owned, co-pending application filed concurrently herewith, entitled "Advanced Interactive Voice Response Service Node" having application Ser. No. 09/073,880. A network architecture 100 is described in further detail in a commonly-owned, co-pending application filed concurrently herewith, entitled "Telecommunications Network Architecture for Call Center Services using advanced Interactive Voice Response Service Nodes" having application Ser. No. 09/074,096. Additional special features of the NGSN 101 are described in further detail in a co-pending application filed concurrently herewith, entitled "Interactive Voice Response Service Note with Advanced Resource Management" having application Ser. No. 09/074,142. A signaling gateway 116 and a telecommunications provider's proprietary signaling protocol are described in further detail in a commonly-owned, co-pending applications filed concurrently herewith, entitled "Communications Signaling Gateway and System for an Advanced Service Node" having application Ser. No. 09/074,072 and "Call and Circuit State Machine for a Transaction Control Layer of a Communications Signaling Gateway" having application Ser. No. 09/073,885. Lastly, a parking manager 124 is described in a commonly-owned, co-pending application entitled "Network Call Parking Manager" having application Ser. No. 08/796,839, filed Feb. 7, 1997, and a method and system for call parking and transferring, using this architecture, is described in a commonly-owned, co-pending application entitled "System and Method for Call Park and Transfer in a Telecommunications Network" having application Ser. No. 08/796,840, filed Feb. 7, 1997. All of the above commonly-owned, co-pending applications are incorporated herein by reference in their entirety.

Software Architecture

Figure 2:
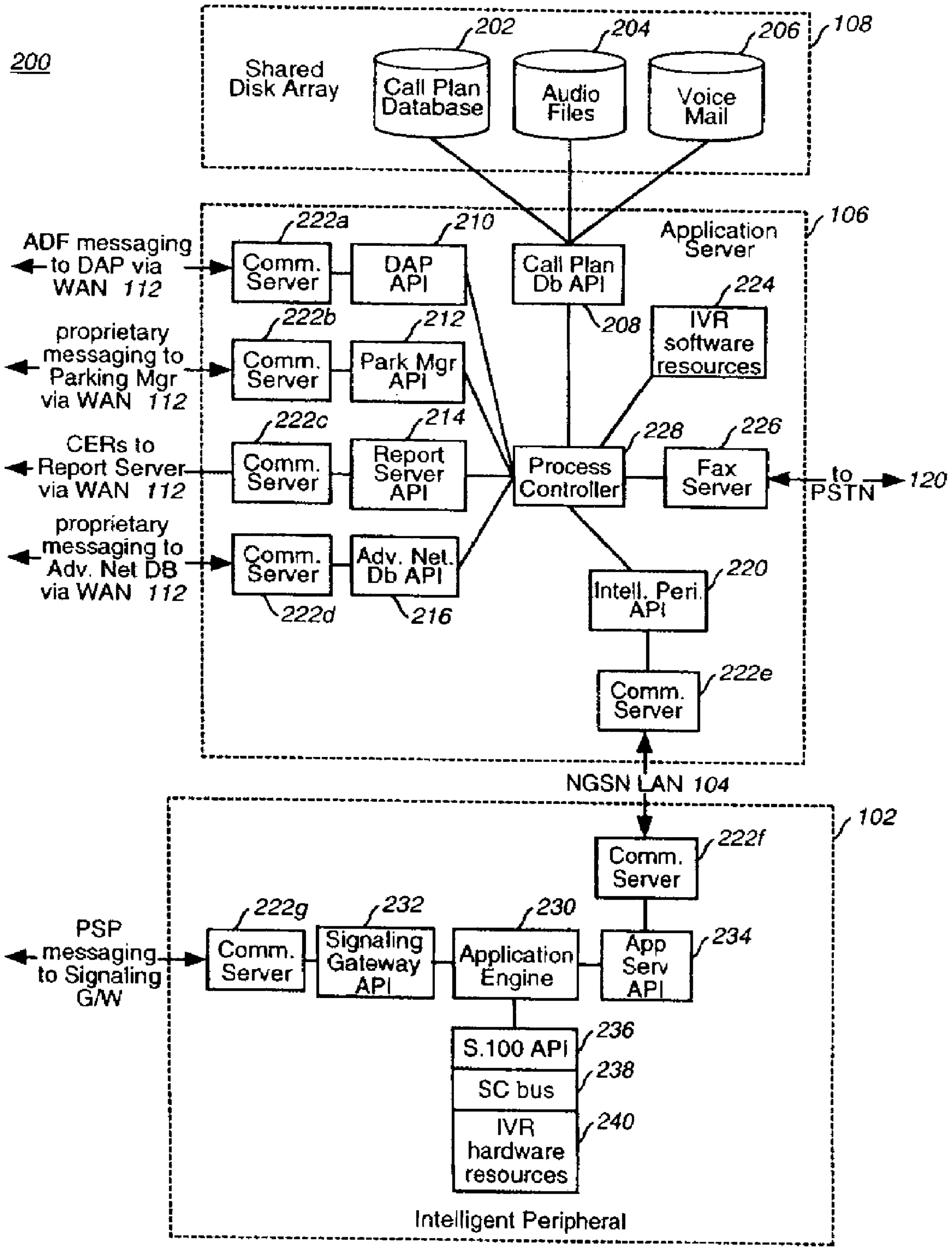
FIG. 2 illustrates the software architecture of a IVR service node according to the present invention.

FIG. 2 illustrates the software architecture 200 of NGSN 101 according to a preferred embodiment. The shared disk array 108 embodies a call plan database 202 and audio files 204. A voicemail system 206 may also be stored here. The call plan database 202 includes customer application files. The customer application files include calls to SIBBs, as well as specific data that are passed to the SIBBs. Audio files 204 encapsulate audio recordings that are played for callers by the intelligent peripheral 102.

The application server 106 has a call plan database application program interface (API) 208 to perform database functions, such as retrieving application files. The application server 106 includes numerous other interfaces to external components. These include a DAP API 210, a parking manager API 212, a report server API 214, and an advanced network database API 216. Application server 106 also includes an intelligent peripheral API 220. A plurality of communications servers 222 (shown as "Comm Server" 222*a*-222*g*) are used to establish LAN 104 or WAN 112 communications between the application server 106, intelligent peripherals 102 and the various components to which they interface.

The application server 106, also includes various IVR software resources 224. These are functional components, such as speaker-independent voice recognition (SIVR), text-to-speech, event logging, alarming, etc. modules. The application server 106 may also includes a fax server 226 because some IVR applications allow a caller to send a fax containing the text of what the caller spoke. The intelligent peripheral 102 records a caller's speech, one of the various IVR software resource 224 then converts the speech to text, and the fax server 226 sends a fax containing this text.

A process controller 228 on the application server 106 represents a software control process that directs commands, requests, and responses from the intelligent peripheral 102 and the various external components with which the application server 106 interfaces.

The intelligent peripheral 102 embodies an application engine 230, which represents the core of NGSN 101 call processing. The application engine 230 interfaces with the signaling gateway 116 via a signaling gateway API 232. The signaling gateway API 232 may encapsulate IVR functions, specified by the application engine 230, into an IVR service provider's proprietary signaling protocol. The proprietary signaling protocol messages are converted into SS7 messages by the signaling gateway 116. This is how the application engine 230 communicates with the bridging switch 114 to setup and process a call. The application engine 230 also uses an application server API 234 to interface with application server 106 process components. Furthermore, in a preferred embodiment, the application engine 230 uses an Enterprise Computer Telephony Forum (ECTF) S.100 Framework API 236 and a Dialogic® SCbus 238 (available from Dialogic Corporation of Parsippany, N.J.) to control IVR hardware resources 240 such as network ports, voice ports, and SIVR digital signal processors (DSPs).

The IVR software resource 224 and IVR hardware resources 240 contained within the NGSN 101 platform are described in further detail in a commonly-owned, co-pending application filed concurrently herewith, entitled Advanced Interactive Voice Response Service Node" having application Ser. No. 09/073,880 which is incorporated herein by reference in its entirety.

NGSN Call Processing

Figure 3:
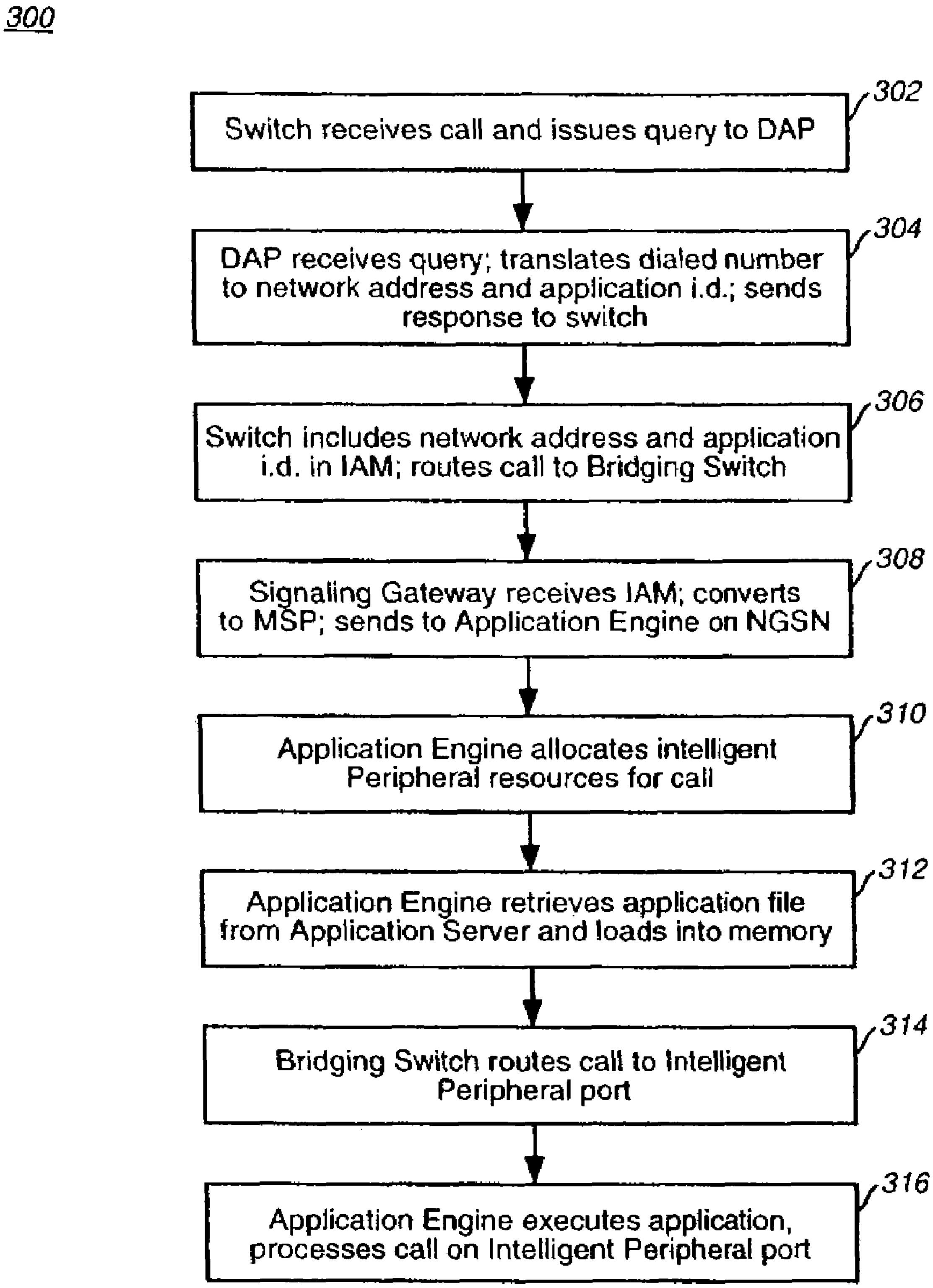
FIG. 3 is a flowchart illustrating the processing of a call by an IVR service node according to the present invention.

Referring to FIG. 3, flowchart 300 illustrates the processing of a call being routed to NGSN 101 and the steps taken by application engine 230 to handle the call. In step 302, an origination switch receives a call that requires NGSN processing. Typically, the dialed number will be a toll free 800/888 number. The origination switch will then issue a query to the DAP 122 for a routing translation.

In step 304, the DAP 122 receives the query and translates the dialed number to a physical network routing address and an application identification number. The network routing address may identify the switch and trunk group corresponding to a bridging switch 114 and trunk group from that bridging switch 114 to an NGSN 101 intelligent peripheral 102. The application identification number is a numeric code recognized by the application engine 230 and assigned to a customer application file when it is created on the SCE 128. The DAP includes the network routing address and application identification number in a response message to the switch.

In step 306, the origination switch routes the call to the bridging switch 114 and includes the network routing address and application identification number in an SS7 initial address message (IAM). In step 308, the bridging switch 114 sends an IAM to NGSN 101 via the signaling gateway 116. The signaling gateway 116 receives the IAM, and converts it to the IVR service provider's proprietary signaling protocol understood by the NGSN 101. The signaling gateway 116 sends the translated IAM to the application engine 230 on NGSN 101.

In step 310, the application engine 230 receives the translated IAM and allocates resources on the intelligent peripheral 102 to handle the call. The application engine 230 returns a message to the signaling gateway 116 indicating that resources are available. The signaling gateway 116 then converts that message from the IVR service provider's proprietary signaling protocol system to an SS7 message, and sends the SS7 message to the bridging switch 114, so that the bridging switch 114 may complete the call. A signaling gateway 116 and a telecommunications provider proprietary signaling protocol are described in further detail in a commonly-owned, co-pending application filed concurrently herewith, entitled "Communications Signaling Gateway and System for an Advanced Service Node" having application Ser. No. 09/074,072 which is incorporated herein by reference in its entirety.

In step 312, the application engine 230 uses the application identification number in the message to retrieve the customer application file from the application server 106. A request for the application file is sent to an application server 106. The process controller 228 receives the request and, using the call plan database API 208, retrieves the customer application file from the call plan database 202. It then sends the customer application file to the application engine 230. The application engine 230 then loads the customer application file into the memory of the intelligent peripheral 102. In step 314, while the application engine 230 is loading the customer application file into memory, the bridging switch routes the call to a port on the intelligent peripheral 102.

In step 316, the application engine 230 executes the customer application. In a preferred embodiment, the application identification number is a ten-digit number where the first seven digits comprise a unique file number. The last three digits specify the entry point in the customer application file where execution will begin. This is explained below with reference to Table 1 and FIG. 7*f*. During execution of the customer application file, several interactions with the caller are performed. These include playing various recordings for the caller, and accepting input from the caller. Throughout the course of processing a call, various interactions with external network components may take place. For example, the customer application may require the transferring of the call to another network destination, based on a routing plan that is triggered by caller input. A specific routing plan may be stored in the advanced network database 130. The application engine 230 sends a query, as specified in the customer application, to the application server 106. This query is received by the process controller 228. The process controller 228 uses the advanced network database API 216 to formulate a query in the proper message structure, and then sends this query to the advanced network database 130 via the WAN 112. When a response is received, the advanced network database API 216 extracts the response from the response message, and passes it to the process controller 228. The process controller 228 forwards the response to the application engine 230. This response is a routing destination, which may be a dialed number that requires translation. The application engine 230 sends a translation request to the DAP 122 in a way analogous to that just described, using the DAP API 210.

The above describes NGSN 101 processing with an application engine 230 residing on each intelligent peripheral 102. In an alternate embodiment, an application engine 230 resides on each application server 106 and processing is similar to that described above. In this alternate embodiment, the resources on the intelligent peripheral 102 act as slaves to commands issued by the application engine 230 on the application server 106.

Service Execution Environment

The NGSN 101 Service Execution Environment includes those processes and data entities that are used to perform a customer application and process a call. More, specifically, the environment includes the processes and data entities needed to perform step 316 of flowchart 300 (as shown in FIG. 3). These processes and data entities include application files, application data, audio files, application engine 230, and service-independent building blocks (SIBB).

As mentioned above, a customer application file includes an IVR application. Customer application files are stored within the call plan database 202 on the shared disk array 108. A customer application file incorporates calls to various individual SIBBs, and application-specific data. Data are passed to a SIBB with the functional SIBB call. A SIBB is executed by the application engine 230 using data provided by the customer application file.

Audio files are files, objects, or some other data entity that encapsulate audio recordings, such as voice or music. When an IVR application is performed, a common task is to play an audio recording for the caller. References to audio files are contained within customer application files and SIBBs. When the application engine 230 executes an application and encounters a reference to an audio file, the application engine 230 retrieves and reads the audio file. A voice port, part of the IVR hardware resources 240, on the intelligent peripheral 102 plays the audio file to the caller, as directed by the called SIBB.

SIBBs are common, reusable software modules that are independent of any application. A SIBB, when executed, performs a common IVR function. In a preferred embodiment, the executable code for SIBBs contains no specific reference to, or reliance on, any application or specific data. A SIBB uses variables, for which data are passed to the SIBB by the application engine 230 when the SIBB is called. The executable code for SIBBs are embodied by the application engine 230. Once created, tested, and certified, these SIBBs are then available to be combined in any sequence to produce a customer application file. This is done without the need to rebuild and test the SIBBs every time a customer application is created. The advantage is that the build time for applications is significantly reduced.

An IVR application may built by combining SIBBs to perform needed functions. This includes the ability of customer applications to branch according to the evaluation of a condition. In this way, a customer application, which represents a call plan, is a tree of nodes and branches, each node represented by a SIBB. A customer application may branch from one SIBB based on a condition tested within the SIBB and the success versus failure of a SIBB's operation.

Figure 4:
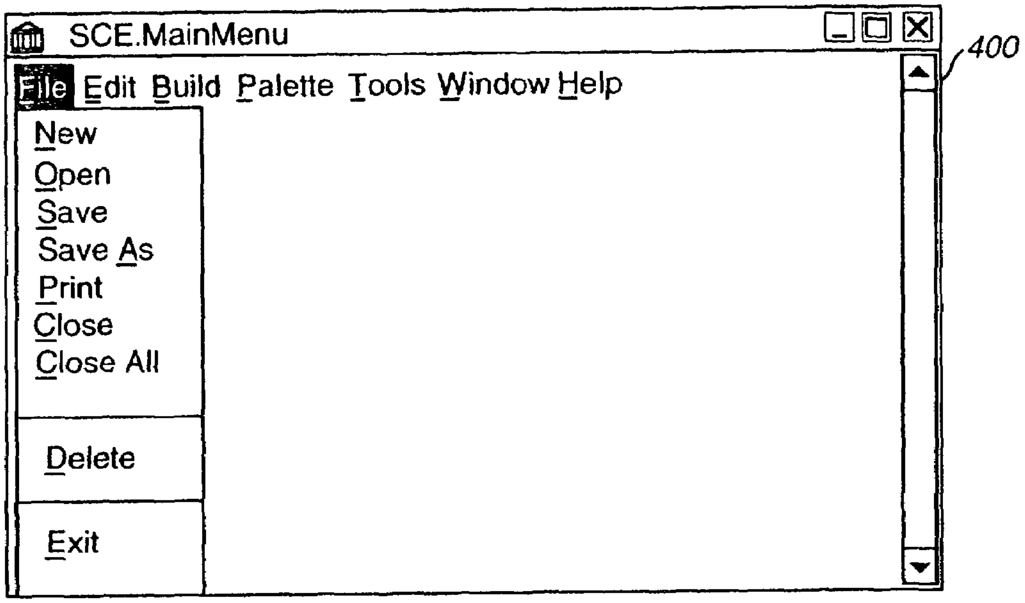
FIG. 4 is an illustration of an exemplary graphical user interface (GUI) main menu window according to the present invention.

A customer application is built (created) on the service creation environment (SCE) 128 (see FIG. 1). The SCE 128 is a computing platform that provides a user through a graphical user interface (GUI), with a palette of individual primitive SIBBs, as well as composite SIBBs and template applications. A composite SIBB is two or more primitive SIBBs bundled together to realize a common function. This allows a user to build an application at an even higher level than just using primitive SIBBs. FIG. 4 shows an exemplary main menu 400 of the SCE 128 GUI which would allow a user to create, save, open, print, close, and delete customer application files.

Figure 5:
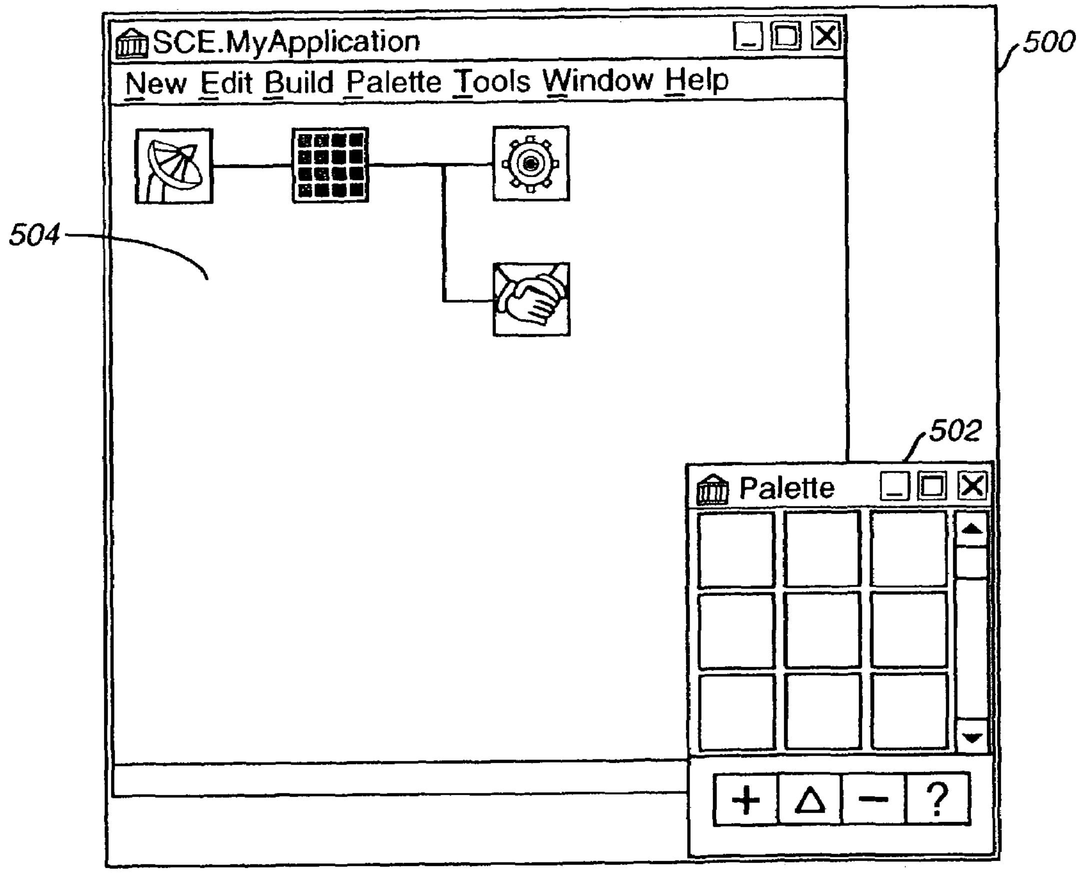
FIG. 5 is an illustration of an exemplary GUI customer application creation window according to the present invention.

As a user selects each SIBB (referred to as a "node" on the SCE 128), they are numbered in sequence to distinguish them from the other nodes. This is illustrated in FIGS. 7*a-r* (e.g., "Node=0012" means this is the twelfth instance of a SIBB in a particular customer application file). FIG. 5 shows an exemplary SCE 128 GUI display 500, for a customer in the process of creating an application file. The SCE 128 GUI provides a palette of icons 502 representing SIBBs and displays them in a graph 504 form representing the call flow logic. In a preferred embodiment, graph 504 flows left to right, top to bottom. The top horizontal sequence represents the most commonly taken (positive) path. The depth of the graph 504 represents less taken paths (i.e., failure paths).

Figure 6:
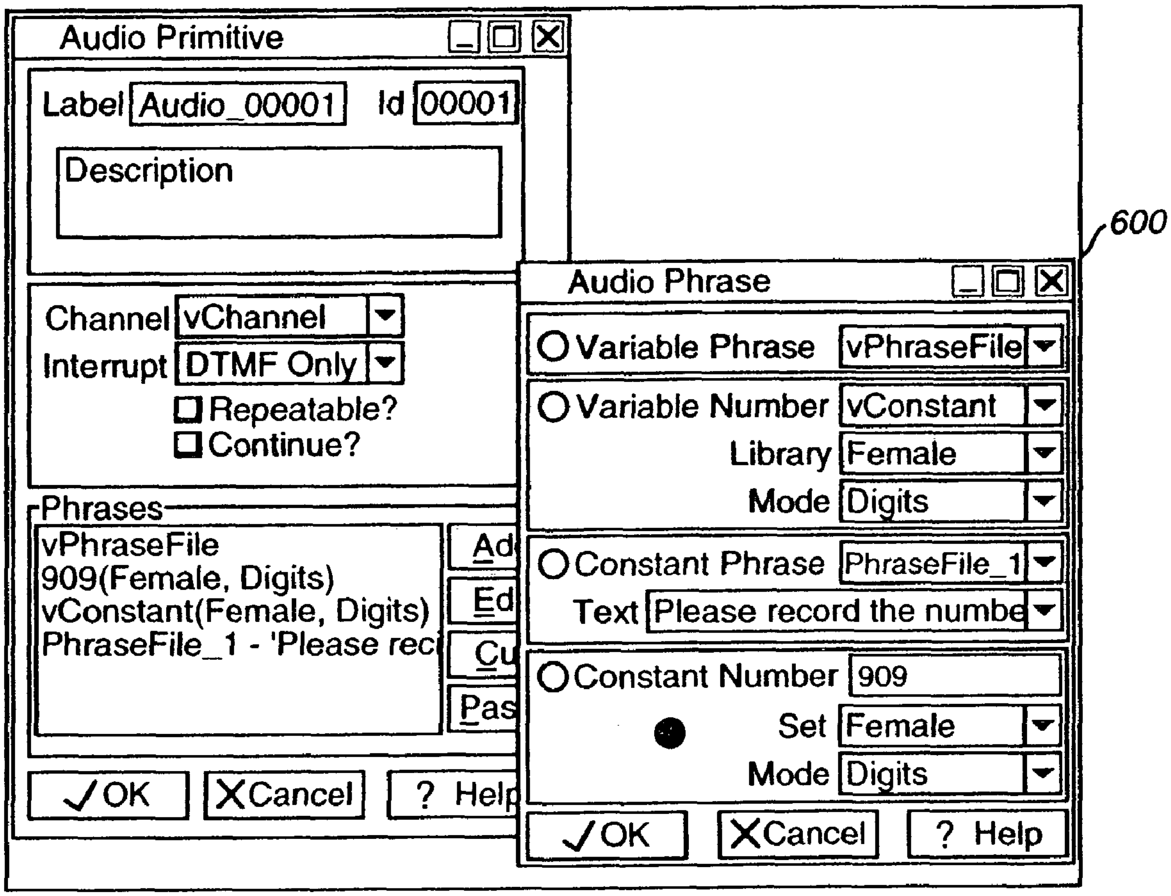
FIG. 6 is an illustration of an exemplary dialog box for selecting a service-independent building block (SIBB) according to the present invention.

FIG. 6 shows an exemplary dialog box 600 that the SCE 128 GUI provides so that the customer can enter specific input data for the defined SIBBs. Dialog box 600 appears on the GUI if a customer selects the icon for a primitive Audio SIBB (see FIG. 7*a* and Table 1 below) from the palette 502. As would be apparent to one skilled in the relevant art(s), the SCE 128 GUI contains a corresponding dialog box 600 for each defined SIBB.

Table 1 describes, and FIGS. 7*a-r* logically illustrate, each of the eighteen primitive SIBBs defined and created for a NGSN 101 nodes (and more specifically, the application engine 230) in a preferred embodiment of the present invention. It will be apparent to one skilled in the relevant art(s) that additional primitive SIBBs may be defined in accordance with the present invention. These additional SIBBs may be added to SCE 128 in a "plug and play" manner.

TABLE 1

| SIBB | DESCRIPTION |
|---|---|
| Audio | The Audio SIBB plays a message to a specified channel. The message can be a single message or a message that repeats. Messages are composed of a number of phrases strung together. Each phrase can be a specific customer message, a message from a standard library, a spoken variable, a caller-recorded message, or a tone. For messages that are played once, control passes to the next SIBB when the message is completed or interrupted. For messages that are repeatable, control passes to the next SIBB as soon as the repeatable message is initiated. This allows the IP 102 to put a party on hold and proceed to the next task. An Audio SIBB to a primary channel A is shown in FIG. 7a |
| Branch | The Branch SIBB transfers control to the next SIBB as determined by the value of a variable input and pre-established ranges for that variable. FIG. 7b illustrates a Branch SIBB defined for the variable "size" and three predetermined ranges 1-10, 11 and 12-15. |
| Bridge | The Bridge SIBB either establishes (makes) a bridge or breaks a bridge between two channels. If a bridge is established, it allows two parties within a call to converse. These parties can be any two parties within a call. Control then passes immediately to the next SIBB. A Bridge SIBB to make a connection from Channel A to B is shown in FIG. 7c. |

TABLE 1-continued

| SIBB | DESCRIPTION |
|---|---|
| Call | The Call SIBB dials out of the NGSN 101 platform to a specified party on a specified channel. A Call is one of three types:<br>(1) Call Plan Termination - The termination data is obtained directly from the call plan database 202.<br>(2) DAP DB Termination - The termination data is obtained from the DAP 122 database query.<br>(3) Advance DB Termination - The termination data is obtained from the advanced network database 130 query.<br>Control progresses to the next SIBB by a success (call supervision obtained or parking response returned), a database failure ("db__fail"), a dialing failure ("dial__fail") node, or a busy no answer routing ("bnar") node. A Call SIBB is illustrated in FIG. 7d. |
| Conference | The Conference SIBB adds a party to a conference or deletes a party from a conference. Once in the conference DTMF monitoring for pre-established sequences on each channel begins. Control progresses to the next SIBB by a success or fail path. A Conference SIBB to add a party is shown in FIG. 7q. |
| Database | The Database SIBB provides read and update access to external databases and read-only access to a local database. The types of external databases accessed include DAP 122 databases, advanced network databases 130, the call plan database 202, and a customer host database (located on the customer's premises). Control will exit the Database SIBB to the next SIBB by a success or fail path-when either a successful database response is received or a failure is determined. A Database SIBB to access advanced network database 130 for a particular customer (identified by a corporate number) is shown in FIG. 7e. |
| Entry | Entry represents a specific point at which an application is started. Each application has to have at least once entry point and could have possibly several. For example, an application file may have 2 different entry points—one for each of two different 800 numbers that trigger the execution of that application file. The two entry points may lead to two different greeting messages. When an Entry point is executed, system variables are initialized. An Entry SIBB to a point 001 is shown in FIG. 7f. |
| Exit | An Exit SIBB terminates a call on the NGSN 101 platform. A conversation between two parties can continue after an Exit if the input to the Exit SIBB specifies Release Link Trunk (RLT). An Exit SIBB that specifies RLT is shown in FIG. 7g. |
| FAX | FAX sends a textual fax using the fax server 226. Control exits from a FAX SIBB to the next SIBB by a success or fail path—as soon as the message has been successfully transmitted or it has been determined that an error occurred. A FAX SIBB with destination and message inputs is shown in FIG. 7h. |
| Hangup | The Hangup SIBB terminates or hangs up a specified channel. Control proceeds to the next SIBB immediately following completion of the hangup. A Hangup SIBB of Channel B is shown in FIG. 7i. |
| Input | Input collects and validates caller-entered data. Data from a specified channel is inputted via DTMF, the spoken voice or the like. Parameters for the input data such as the number of digits expected, a timeout, and interdigit timeouts are passed as parameters from the application file. Control exits the Input SIBB when the expected number of digits is entered, incomplete, timeout, etc. An Input SIBB from Channel A is shown in FIG. 7j. |
| Interrupt | An interrupt occurs when a channel in the call disconnects unexpectedly. There are four types of interrupts, channel I disconnect, channel 2 disconnect, channel 3 disconnect, and catastrophic disconnect. Each customer application needs to have a programmed response when interrupts occur. Execution of this SIBB defines where the application will jump to when each of the four types of interrupts occur. Note that this SIBB is not executed when an interrupt occurs; it is executed before. This SIBB will be executed at the beginning of a call and at every point in the call plan where the interrupt action taken needs to change. Each execution of Interrupt overrides the previous execution. Control is immediately passed to the next SIBB upon execution of this SIBB. A Interrupt SIBB is shown in FIG. 7k. |
| Jump | Jump is a branch to another application's entry point. On normal execution of the Jump SIBB, control, data, and call state data pass to the named application. A Jump SII3B to a specific application identification number is shown in FIG. 7l. |
| Manipulate | Manipulate executes a string of mathematical operations (add, subtract, multiply, divide, etc.) Control passes to the next SIBB immediately following completion of the operations defined by a success or fail path. A Manipulate SIBB is shown in FIG. 7m. |
| Menu | Menu is a hybrid of the Audio, Input and Branch primitive SIBBs. The Menu primitive is ideal for accepting single digit DTMF entries from a caller. It also has timeout and input error trapping capabilities. A Menu SIBB is shown in FIG. 7n. |
| Park | The Park SIBB provides the functionality to support parking of a call on the NGSN 101 platform. Parking interfaces with the parking manager 124, to send and receive commands and information to park and subsequently release a call. Control exits from the Parking SIBB by a success or fail path-when the call is extended or when it cannot be extended. A Park SIBB is shown in FIG. 7r. |

TABLE 1-continued

| SIBB | DESCRIPTION |
| --- | --- |
| Provision | The Provision SIBB is used to send a message, via a provisioning system, to all NGSNs 101 on the network architecture 100. The message can be recorded audio or a logical switch update. Control exits from the Provision SIBB by a success or fail path-when the message has been accepted or an error is determined. A Provision SIBB sending audio is shown in FIG. 7o. |
| Record | The Record SIBB records the speech of a caller. This could be played back later in the call, for instance to announce a caller, or it could be used to update an existing message. Record allows a unique reference label to associate each instance of the SIBB. Control proceeds to the next SIBB immediately. following completion of the recording. A Record SIBB is shown in FIG. 7p. |

A simple example of a composite SIBB is a primitive Audio SIBB combined with a primitive Branch SIBB as shown in FIG. 8*a*. This new composite SIBB, named cAudio, allows an optional message ("OptMsg") to be played to an originating channel based on some customer specified condition ("OptMsg_TF") being true or false. By creating a composite cAudio SIBB from the primitive Audio and Branch SIBBs, the user (seeing the cAudio SIBB on the SCE 128 GUI as shown in FIG. 8*b*) does not need to know that a combination of the Branch and Audio SIBBs is needed to successfully implement a conditional audio play function.

Examples of more complex composite SIBBs that may be implemented using the primitive SIBBs include Take Back and Transfer (TNT) and Call Parking. These functions, which are common in IVR applications, include the functions of many different primitive SIBBs. For example, TNT could include a Database SIBB to look up possible terminations, an Input SIBB to collect a selection from the caller, a Hangup, a Call, and several Manipulate SIBBs. A composite TNT SIBB including all of these in the proper sequence would allow users of the SCE 128 to bypass the process of creating a TNT function each time, it is needed in a customer application.

Template applications are also provided in the SCE 128. These are simple applications that are commonly used, such as "Dealer Locate," which is well known in the relevant art. An actual customer application may be created from a template by simply filling in specific data, and perhaps adding a few composite or individual SIBBs where needed.

Application Execution

As shown in FIG. 2, application engine 230 is a process that runs on each intelligent peripheral 102. The application engine 230 is responsible for executing applications, maintaining call context data for multiple concurrent calls, and creating call event records (CERs) and billing event records (BERs). The application engine 230 includes the executable code for all SIBBs. It retrieves customer application and audio files which are stored on the shared disk array 108, via calls to an application server 106.

The application engine 230 executes an application by retrieving the customer application file from the application server 106, and loading it into a transient data store on the intelligent peripheral 102 (step 312 of FIG. 3). It reads the application file, and performs calls to SIBBs as specified by the application file. The application engine 230 executes each SIBB as it is called, using specific data provided by the application file (step 316 of FIG. 3).

Execution of an application results in various IVR tasks. These include playing an audio recording for the caller, accepting caller input via SIVR, DTMF or the like, recording caller input, transferring a call to another network destination, and other functions.

Execution of an application by the application engine 230 also results in the creation of a CER and a BER. When the intelligent peripheral 102 first receives a call, the application engine 230 opens a CER. As the application engine 230 processes an application to handle a call, events are written to the CER. Each SIBB that gets executed may generate data that gets written to the CER. There is one CER for an entire call. When the call is completed, the CER is passed to the report server API 214 on the application server 106. The report server API 214 sends batches of CERs to the report server 132, via the WAN 112.

A single application engine 230 may be used for all applications on all calls on a single intelligent peripheral 102. In an alternate embodiment, a plurality of application engines 230 may be used if needed for increased performance.

Example Environment

The present invention (i.e., the service execution environment 128 or any part thereof) may be implemented using hardware, software or a combination thereof and may, be implemented in a computer system or other processing system. In fact, in one embodiment, the invention is directed toward a computer system capable of carrying out the functionality described herein. An example of a computer system 900 is shown in FIG. 9. The computer system 900 includes, one or more processors, such as processor 904. The processor 904 is connected to a communication bus 906. Various software embodiments are described in terms of this exemplary computer system. After reading this description, it will become apparent to a person skilled in the relevant art how to implement the invention using other computer systems and/or computer architectures.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCMCIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path (i.e., channel) 926. This channel 926 carries signals 928 and may be implemented using wire or cable, fiber optics, a phone line, a cellular phone link, an RF link and other communications channels.

In this document, the terms "computer program medium" and "computer usable medium" are used to generally refer to media such as removable storage drive 914, a hard disk installed in hard disk drive 912, and signals 928. These computer program products are means for providing software to computer system 900.

Computer programs (also called computer control logic) are stored in main memory 908 and/or secondary memory 910. Computer programs may also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not, be limited by any of the above-described exemplary embodiments, but should be defined only in accordance with the following claims and their equivalents.

What is claimed is:

1. A method for providing advanced interactive voice response services within a telecommunications network, comprising the steps of:

defining a reusable set of service-independent building blocks in a node of said telecommunications network;

creating a customer application file using a customer-specified sequence of said service-independent building blocks in a server of said telecommunications network, wherein a set of customer specific data is defined for use as inputs into said set of service-independent building blocks; and retrieving said customer application file for execution by said node from said server over a communications network.

2. The method of claim 1, further comprising the step of:

executing said customer application file on the node to handle a call.

3. The method of claim 1, wherein said defining step comprises the steps of:

defining rules under which each of said set of service-independent building blocks operate;

defining inputs for each of said set of service-independent building blocks; and defining outputs for each of said set of service-independent building blocks.

4. The method of claim 1, wherein said creating step comprises the step of:

using a sequence of at least one of the following of said set of service-independent building blocks:

Audio;
Branch;
Bridge;
Call;
Conference;
Database;
Entry;
Exit;
FAX;
Hangup;
Input;
Interrupt;
Jump;
Manipulate;
Menu;
Park;
Provision; and
Record.

5. The method of claim 2, wherein said creating step further comprises the steps of:

storing said set of customer specific data in an advanced network database of said server to create a customer specific data file.

6. The method of claim 5, further comprising:

assigning said customer application file an identification number associated with said customer specific data file.

7. The method of claim 6, wherein said executing step comprises the steps of:

retrieving said customer application file using said application identification number;

retrieving said customer specific data file from said advanced network database; and using said set of customer specific data in said customer specific data file as inputs into said sequence of said set of service-independent building blocks.

8. A system for providing advanced interactive voice response services within a telecommunications network, comprising:

means for defining a reusable set of service-independent building blocks in a node of said telecommunications network;

means for creating a customer application file using a customer-specified sequence of said service-independent building blocks in a server of said telecommunications network, wherein a set of customer specific data is defined for use as inputs into said set of service-independent building blocks; and means for retrieving said customer application file for execution by said node from said server over a communications network.

9. The system of claim 8, further comprising:

means for executing said customer application file on the node to handle a call.

10. The system of claim 8, wherein said defining means comprises:

first defining means for defining rules under which each of said set of service-independent building blocks operate;

second defining means for defining inputs for each of said set of service-independent building blocks; and third defining means for defining outputs for each of said set of service-independent building blocks.

11. The system of claim 10, wherein said creating means comprises:

means for using a sequence of at least one of the following of said set of service-independent building blocks:

Audio;
Branch;
Bridge;
Call;
Conference;
Database;
Entry;
Exit;
FAX;
Hangup;
Input;
Interrupt;
Jump;
Manipulate;
Menu;
Park;
Provision; and
Record.

12. The system of claim 8, wherein said defining means further comprises:

means for storing said set of customer specific data in an advanced network database of said applications server to create a customer specific data file.

13. The system of claim 12, further comprising:

means for assigning said customer application file an identification number associated with said customer specific data file; and second means for storing said customer application file on the server.

14. The system of claim 13, wherein said means for executing comprises:

first means for retrieving said customer application file using said application identification number;

second means for retrieving said customer specific data file from said advanced network database; and means for using said set of customer specific data in said customer specific data file as inputs into said sequence of said set of service-independent building blocks.

15. A computer program product comprising a computer usable medium having computer readable code means embodied in said medium for causing an application program to execute on a computer that provides a system for providing advanced interactive voice response services, said computer readable program code means performing the following steps:

defining a reusable set of service-independent building blocks in a node of said telecommunications network;

creating a customer application file using a customer-specified sequence of said service-independent building blocks in a server of said telecommunications network, wherein a set of customer specific data is defined for use as inputs into said set of service-independent building blocks; and retrieving said customer application file for execution by said node from said server over a communications network.

16. A method for supporting an interactive voice response (IVR) service, the method comprising:

receiving a message associated with a call invoking the IVR service, the message specifying an application identifier corresponding to a customer application file providing a call plan; and retrieving the customer application file based on the application identifier, wherein the customer application file is created according to a plurality of reusable, application independent software modules that receive customer specific data as inputs, the customer specific data being stored as a file in a database.

17. The method of claim 16, further comprising: executing the customer application file to handle the call.

18. The method of claim 16, wherein the modules in the retrieving step are associated with a plurality of primitives relating to call handling.

19. The method of claim 18, wherein a set of the primitives is bundled to support a common function.

20. A system for supporting an interactive voice response (IVR) service, the system comprising:

a communication interface configured to receive a message associated with a call invoking the IVR service, the message specifying an application identifier corresponding to a customer application file providing a call plan;

an application engine coupled to the communication interface and configured to retrieve the customer application file based on the application identifier, wherein the customer application file is created according to a plurality of reusable, application independent software modules that receive customer specific data as inputs; and a database configured to store the customer specific data as a file.

21. The system of claim 20, wherein the application engine executes the customer application file to handle the call.

22. The system of claim 20, wherein the modules are associated with a plurality of primitives relating to call handling.

23. The system of claim 22, wherein a set of the primitives is bundled to support a common function.

24. A method for supporting an interactive voice response (IVR) service, the method comprising:

receiving a request for a customer application file that specifies a call plan, the request including an application identifier corresponding to the customer application file; and transmitting the customer application file in response to the request, wherein the customer application file is created according to a plurality of reusable, application independent software modules that receive customer specific data as inputs, the customer specific data being stored as a file in a database.

25. The method of claim 24, wherein the customer application file is transmitted to an application engine for execution of the customer application file.

26. The method of claim 24, wherein the modules in the transmitting step are associated with a plurality of primitives relating to call handling.

27. The method of claim 26, wherein a set of the primitives is bundled to support a common function.

28. A system for supporting an interactive voice response (IVR) service, the system comprising:

a controller configured to receive a request for a customer application file that specifies a call plan, the request including an application identifier corresponding to the customer application file;

a communication interface coupled to the controller and configured to transmit the customer application file in response to the request, wherein the customer application file is created according to a plurality of reusable, application independent software modules that receive customer specific data as inputs; and a database configured to store the customer specific data as a file.

29. The system of claim 28, wherein the customer application file is transmitted to an application engine for execution of the customer application file.

30. The system of claim 28, wherein the modules are associated with a plurality of primitives relating to call handling.

31. The system of claim 30, wherein a set of the primitives is bundled to support a common function.

* * * * *